US010382836B2

(12) United States Patent
Havinal

(10) Patent No.: US 10,382,836 B2
(45) Date of Patent: Aug. 13, 2019

(54) SYSTEM AND METHOD FOR DYNAMICALLY GENERATING AND RENDERING HIGHLIGHTS OF A VIDEO CONTENT

(71) Applicant: WIPRO LIMITED, Bangalore (IN)

(72) Inventor: Darshan Havinal, Bellary (IN)

(73) Assignee: Wipro Limited, Bangalore (IN)

(*) Notice: Subject to any disclaimer, the term of this patent is extended or adjusted under 35 U.S.C. 154(b) by 0 days.

(21) Appl. No.: 15/682,574

(22) Filed: Aug. 22, 2017

(65) Prior Publication Data
US 2019/0007732 A1 Jan. 3, 2019

(30) Foreign Application Priority Data
Jun. 30, 2017 (IN) .............................. 201741023139

(51) Int. Cl.
*H04N 21/44* (2011.01)
*H04N 21/45* (2011.01)
(Continued)

(52) U.S. Cl.
CPC ..... *H04N 21/8549* (2013.01); *H04N 21/4334* (2013.01); *H04N 21/44008* (2013.01);
(Continued)

(58) Field of Classification Search
CPC ....... H04N 21/44008; H04N 21/44218; H04N 21/8545; H04N 21/4532; H04N 21/4334
See application file for complete search history.

(56) References Cited

U.S. PATENT DOCUMENTS

2002/0136528 A1 9/2002 Dagtas
2008/0138029 A1 6/2008 Xu et al.
(Continued)

FOREIGN PATENT DOCUMENTS

WO WO 2014/179017 11/2014

OTHER PUBLICATIONS

Otsuka, I., et al., "A Video Browsing Enabled Personal Video Recorder", *Multimedia Content Analysis, Signals and Communication Technology*, pp. 389-390, 2009.
(Continued)

*Primary Examiner* — Benjamin R Bruckart
*Assistant Examiner* — Akshay Doshi
(74) *Attorney, Agent, or Firm* — Finnegan, Henderson, Farabow, Garrett & Dunner, LLP

(57) ABSTRACT

This disclosure relates generally to audio-video processing, and more particularly to system and method for dynamically generating and rendering highlights of a video content. In one embodiment, the method may include receiving a start trigger and a stop trigger to generate and render the highlights of a portion of the video content playing on a first device for a registered user, recording at least one sub-portion of the portion of the video content upon receiving the start trigger and until receiving the stop trigger, monitoring the at least one sub-portion of the video content to detect one or more critical events, dynamically generating the highlights of the at least one sub-portion of the video content for each of the one or more critical events, and dynamically rendering the highlights of the at-least one sub-portion of the video content on a second device in possession of the registered user.

17 Claims, 6 Drawing Sheets

(51) Int. Cl.
*H04N 21/433* (2011.01)
*H04N 21/442* (2011.01)
*H04N 21/8549* (2011.01)
*H04N 21/8545* (2011.01)

(52) U.S. Cl.
CPC ... *H04N 21/44218* (2013.01); *H04N 21/4532* (2013.01); *H04N 21/8545* (2013.01)

(56) References Cited

U.S. PATENT DOCUMENTS

| | | | |
|---|---|---|---|
| 2011/0061109 A1* | 3/2011 | Austin | H04N 7/163 726/27 |
| 2014/0168277 A1* | 6/2014 | Ashley | G06F 3/1446 345/672 |
| 2014/0331260 A1 | 11/2014 | Gratton | |
| 2015/0070507 A1* | 3/2015 | Kagan | G01D 4/002 348/160 |
| 2015/0201237 A1 | 7/2015 | Seiden et al. | |
| 2017/0076172 A1* | 3/2017 | Meredith | G06K 9/00577 |
| 2017/0332125 A1* | 11/2017 | Panchaksharaiah | H04N 21/21805 |
| 2017/0332139 A1* | 11/2017 | Blake | H04N 21/431 |
| 2018/0131987 A1* | 5/2018 | Kim | H04N 21/23113 |

OTHER PUBLICATIONS

Bailjal, A., et al., "Sports highlights generation based on acoustic events detection: A rugby case study". *IEEE International Conference on Consumer Electronics (ICCE)*, pp. 20-23, 2015.

\* cited by examiner

SYSTEM AND METHOD FOR DYNAMICALLY GENERATING AND RENDERING HIGHLIGHTS OF A VIDEO CONTENT

TECHNICAL FIELD

This disclosure relates generally to audio-video processing, and more particularly to system and method for dynamically generating and rendering highlights of a video content.

BACKGROUND

A wide variety of video contents are consumed by people through various rendering devices such as television, computer, projector, and so forth. The video content may be a recorded video content, a live video content, or a telecasted video content. Further, the video content may be transmitted to the rendering devices from a server of a video content provider through a broadcast, a unicast, or a multicast. Alternatively, the video content may be provided to the rendering devices through a video content storage device. In many cases, it may be difficult for a viewer to watch the complete video content in an uninterrupted manner. A number of distractions such as receiving an important call, attending to an important message, attending to a visitor, attending to children or guest, and so forth may cause the viewer to miss important portion of the video content.

The problem may be accentuated while watching live broadcast events (e.g., sport events) along with a small group of people at home or in a public area. Any distractions may cause a viewer watching live broadcast event to miss the live actions mid-way, thereby causing inconvenience to the viewer. The viewer may have to miss one or more significant portions of the live broadcast event due to such disturbances. Thus, when the viewer gets back to resume watching the live broadcast event, the viewer may be either not updated or may have lost track of the event. Trying to catch up on the missed portion of the event through other co-viewers may often leads to disturbing the co-viewers.

SUMMARY

In one embodiment, a method for dynamically generating and rendering highlights of a video content playing on a first device is disclosed. In one example, the method may include receiving a start trigger and a stop trigger to generate and render the highlights of a portion of the video content playing on the first device for a registered user. The method further may include recording at least one sub-portion of the portion of the video content upon receiving the start trigger and until receiving the stop trigger. The method further includes monitoring the at least one sub-portion of the video content to detect one or more critical events. The method further may include dynamically generating the highlights of the at least one sub-portion of the video content for each of the one or more critical events. The method further may include dynamically rendering the highlights of the at-least one sub-portion of the video content on a second device in possession of the registered user.

In one embodiment, a system for dynamically generating and rendering highlights of a video content playing on a first device is disclosed. In one example, the system may include at least one processor and a memory communicatively coupled to the at least one processor. The memory may store processor-executable instructions, which, on execution, may cause the processor to receive a start trigger and a stop trigger to generate and render the highlights of a portion of the video content playing on the first device for a registered user. The processor-executable instructions, on execution, may further cause the processor to record at least one sub-portion of the portion of the video content upon receiving the start trigger and until receiving the stop trigger. The processor-executable instructions, on execution, may further cause the processor to monitor the at least one sub-portion of the video content to detect one or more critical events. The processor-executable instructions, on execution, may further cause the processor to dynamically generate the highlights of the at least one sub-portion of the video content for each of the one or more critical events. The processor-executable instructions, on execution, may further cause the processor to dynamically render the highlights of the at-least one sub-portion of the video content on a second device in possession of the registered user.

In one embodiment, a non-transitory computer-readable medium storing computer-executable instructions for dynamically generating and rendering highlights of a video content playing on a first device is disclosed. In one example, the stored instructions, when executed by a processor, may cause the processor to perform operations including receiving a start trigger and a stop trigger to generate and render the highlights of a portion of the video content playing on the first device for a registered user. The operations may further include recording at least one sub-portion of the portion of the video content upon receiving the start trigger and until receiving the stop trigger. The operations may further include monitoring the at least one sub-portion of the video content to detect one or more critical events. The operations may further include dynamically generating the highlights of the at least one sub-portion of the video content for each of the one or more critical events. The operations may further include dynamically rendering the highlights of the at-least one sub-portion of the video content on a second device in possession of the registered user.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, serve to explain the disclosed principles.

DETAILED DESCRIPTION

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Figure 1:
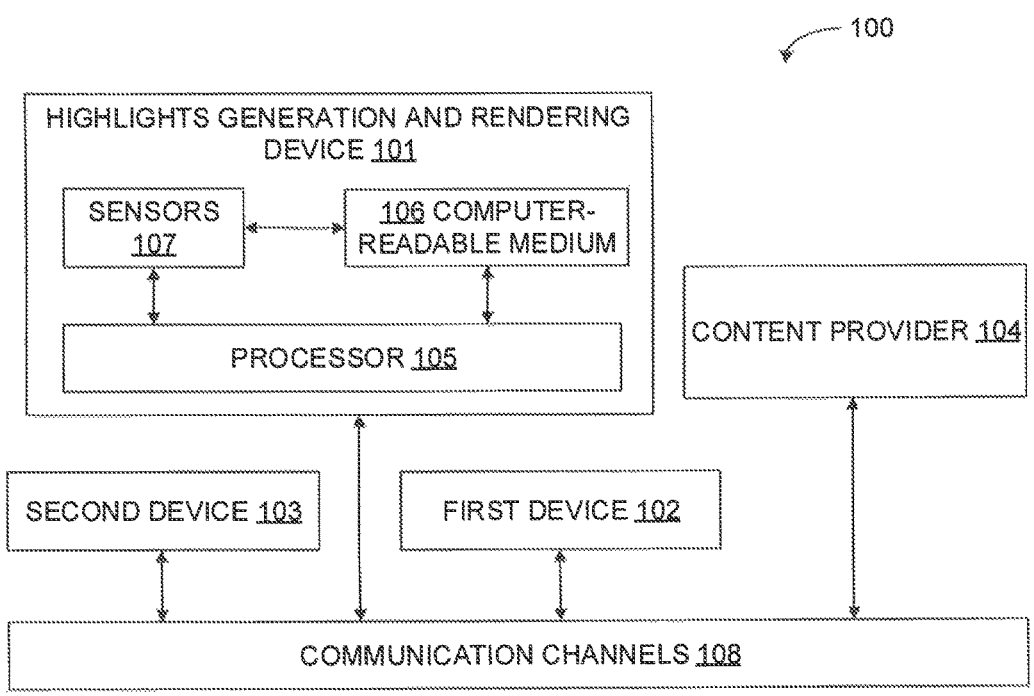
FIG. 1 is a block diagram of an exemplary system for dynamically generating and rendering highlights of a video content in accordance with some embodiments of the present disclosure.

Referring now to FIG. 1, an exemplary system 100 for dynamically generating and rendering highlights of a video content is illustrated in accordance with some embodiments of the present disclosure. In particular, the system 100 may include a highlights generation and rendering device 101, a first device 102, a second device 103, and a content provider or a content storage device 104. The highlights generation and rendering device 101 may generate the highlights of a portion of the video content playing on a first device 102, and may render the generated highlights on a second device 103. As will be appreciated by those skilled in the art, the first device 102 and the second device 103 may be any device capable of playing the video content such as televisions, portable video players, computers, laptops, personal computing devices (e.g., tablet computers, smartphones, etc.), and so forth. Thus, each of the first device 102 and the second device 103 may include at least a display, a speaker, and a video rendering circuitry among other components. In some embodiments, the first device 102 may include a television while the second device 103 may include a personal computing device of a user. Further, as will be appreciated, the content provider 104 may provide the video content playing on the first device 102, and may be located locally or remotely with respect to the first device 102. For example, in some embodiments, the content provider 104 may include, a broadcaster (e.g., STAR SPORTS®, ESPN®, channel 1, channel 2, etc.), a streaming media content provider (e.g., HOTSTAR®, NETFLIX®, etc.), and so forth. Additionally, in some embodiments, the content provider 104 may include a personal video recorder (PVR), a set-top box, a media streaming device (e.g., CHROMECAST®, APPLE TV®, etc.), a digital media player, and so forth. Alternatively, in some embodiments, the content provider 104 may include a storage device such as a portable hard disk.

The highlights generation and rendering device 101 may implement a highlights generation and rendering engine for generating and rendering the highlights of the portion of the video content playing on the first device 102. As will be described in greater detail in conjunction with FIG. 2, the highlights generation and rendering engine may receive a start trigger and a stop trigger to generate and render the highlights of a portion of the video content playing on the first device 102 for a registered user, may record at least one sub-portion of the portion of the video content upon receiving the start trigger and until receiving the stop trigger, may monitor the at least one sub-portion of the video content to detect one or more critical events, may dynamically generate the highlights of the at least one sub-portion of the video content for each of the one or more critical events, and may dynamically render the highlights of the at-least one sub-portion of the video content on a second device 103 in possession of the registered user.

The highlights generation and rendering device 101 may include one or more processors 105, a computer-readable medium (e.g., a memory) 106, and one or more sensors 107. The one or more sensors 107 may include, but are not limited to, a proximity sensor, an infrared sensor, a beacon, an imaging device, and a microphone. The one or more sensors 107 may capture various sensor parameters such as pre-paired second devices, audio of environment, image of the environment, video of the environment, voice of the user, image of the user, video of the user, gaze of the user, and so forth. The sensor parameters may enable the highlights generation and rendering device 101 to detect trigger events (e.g., absence of user, movement of user away from first device, engagement of user with second device, etc.) and to generate triggers to activate the highlights generation and rendering device 101. Further, the one or more sensors 107 may detect various parameters such as ambient audio (e.g., exclamatory words uttered by the viewers, applause from viewers, cheering from viewers, etc.), and an ambient video (e.g., excitement of viewers, gesture or posture of viewers, happy or sad face of viewers, etc.).

The computer-readable medium 106 may store instructions that, when executed by the one or more processors 105, may cause the one or more processors 105 to generate and render highlights of a portion of the video content in accordance with aspects of the present disclosure. The computer-readable storage medium 106 may also store multiple sensor parameters captured by the sensors 107 and other data as required or as processed by the highlights generation and rendering device 101 or the system 100. The one or more processors 105 may perform data processing functions so as to determine the triggering event, monitor the video content, detect the critical events, record the video content, generate the highlights, and render the highlights.

Each of the highlights generation and rendering device 101, the first device 102, the second device 103, and the content provider 104 may interact among each other over various communication channels 108. For example, in some embodiments, the highlights generation and rendering device 101 may receive the video content from the content provider 104 over a communication channel 108, while the first device 102 may receive the video content from the content provider 104 in parallel over a separate communication channel 108. Alternatively, in some embodiments, the first device 102 may receive the video content from the content provider 104 over a communication channel 108, while the highlights generation and rendering device 101 may receive the video content from the first device 102 over a separate communication channel 108. Alternatively, the highlights generation and rendering device 101 may receive the video content from the content provider 104 over a communication channel 108, while the first device 102 may receive the video content from the highlights generation and rendering device 101 over a separate communication channel 108. Further, the second device 103 may receive the highlights of the portion of the video content from the highlights generation and rendering device 101 over a separate communication channel 108. The communication channel 108 may be any wired or wireless communication channel based on different communication technologies (e.g., optical fibre, coaxial cable, universal serial bus (USB), high-definition multimedia interface (HDMI), satellite communication technology, television communication technology, WiFi, WiMax, Bluetooth, mobile communication technologies, and so forth).

As will be appreciated, in some embodiments, the highlights generation and rendering device 101 may be located locally with respect to the first device 102. For example, in some embodiments, the highlights generation and rendering device 101 may be a separate device in communication with the first device 102 either directly, or through the content provider 104 (e.g., PVR, Set-top box, USB drive, etc.). Alternatively, in some embodiments, the highlights generation and rendering device 101 may be embedded within the first device 102, or within the content storage device 104 (e.g., PVR, Set-top box, USB drive, etc.). Further, as will be appreciated, in some embodiments, the highlights generation and rendering device 101 may be located remotely with respect to the first device 102. For example, in some embodiments, the highlights generation and rendering device 101 may be located in a remote server of a highlights generation and rendering service provider. Alternatively, in some embodiments, the highlights generation and rendering device 101 may be embedded within a system of the content provider 104 (e.g., broadcaster, streaming media content provider, etc.).

Further, as will be appreciated, in some embodiments, various components of the highlights generation and rendering device 101 may be physically located together in one device. Alternatively, in some embodiments, the components of the highlights generation and rendering device 101 may be physically distributed across various devices. For example, some of the sensors 107 of the highlights generation and rendering device 101 may be located in the highlights generation and rendering device 101, while some of the sensors 107 may be located in the first device 102, the second device 103, or the content provider 104. Similarly, the processor 105 and the computer readable medium 106 may be physically located together in one device or may be physically distributed across various devices.

Figure 2:
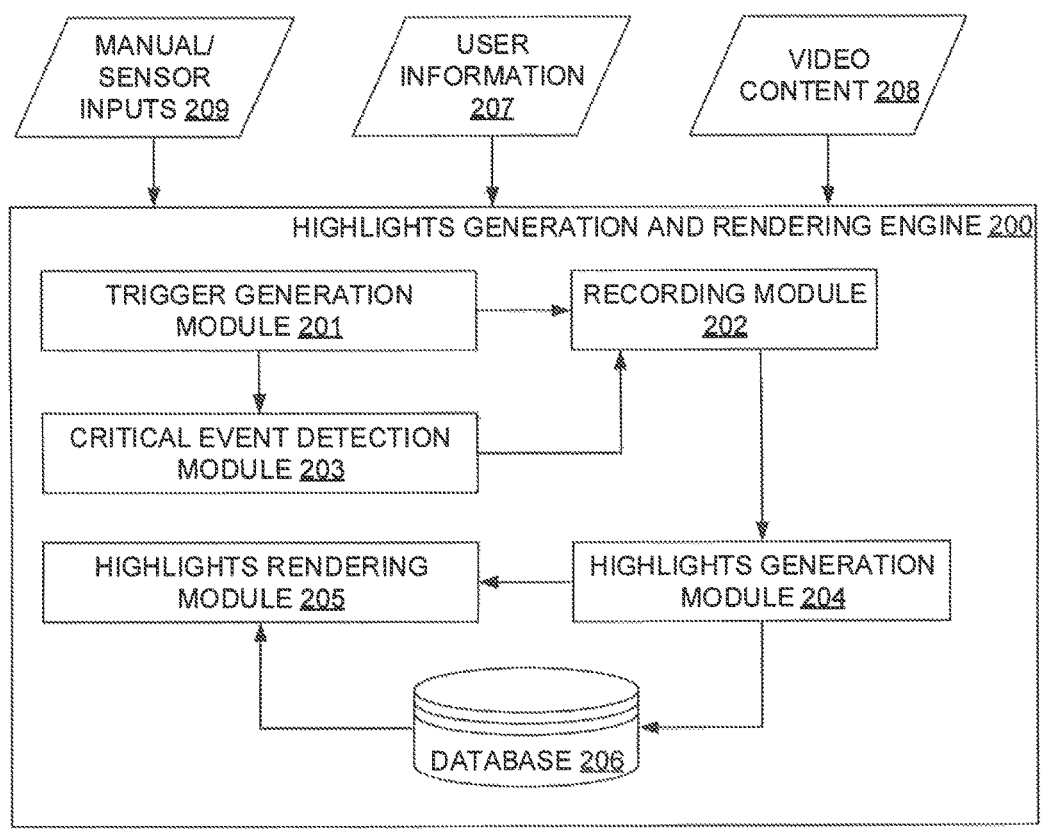
FIG. 2 is a functional block diagram of a highlights generation and rendering engine in accordance with some embodiments of the present disclosure.

Referring now to FIG. 2, a functional block diagram of the highlights generation and rendering engine 200, implemented by the highlights generation and rendering device 101 of the system 100 of FIG. 1, is illustrated in accordance with some embodiments of the present disclosure. In some embodiments, the highlights generation and rendering engine 200 may include a trigger generation module 201, a recording module 202, a critical event detection module 203, a highlights generation module 204, a highlights rendering module 205, and a database 206. As will be appreciated by those skilled in the art, each of the modules 201-206 may reside, in whole or in parts, on any of the highlights generation and rendering device 101, the first device 102, the second device 103, and/or the content provider 104.

In some embodiments, a user may create an account with the highlights generation and rendering engine 200 by creating a user profile. Additionally, in some embodiments, the user may register the second device (i.e., personal device of the user) with the highlights generation and rendering engine 200. Further, in some embodiments, the user may download an application on the second device for customizing setting highlights generation and rendering engine, for registering the second device, for the functioning of the highlights generation and rendering engine, and so forth. The user profile may include a credential of the user such as an identification of the registered user, an authentication information of the registered user, an image of the user, and so forth. The user profile may also include, but is not limited to, a list of preferred video contents (e.g., name of sporting events, name of talk show, etc.), a list of preferred genres (e.g., sports, news, etc.), a customized definition of the critical event (e.g., changing scores, applause, raised audio level in video content, raised ambient audio level, etc.), a customized definition of the start trigger (e.g., absence of user from the vicinity of first device, call on the second device, movement of gaze away from the first device, etc.), a customized definition of the stop trigger (e.g., return of user within the vicinity of first device, end of call on second device, etc.), a preferred length of recording (e.g., 10 minutes, 30 minutes, etc.), and a preferred size of storage for recording (e.g., 100 megabyte, 1 gigabyte, etc.). These user information 207 may be subsequently employed by the highlights generation and rendering engine 200 for generating and rendering the highlights of the video content 208.

The trigger generation module 201 may generate a start trigger and a stop trigger, based on manual or sensor inputs 209, to generate and render the highlights of a portion of the video content 208 playing on the first device. In some embodiments, the trigger generation module 201 may generate the triggers on receiving or detecting a triggering event from the user or from the one or more sensors. The triggering event may be manual or automatic activation of the highlights generation and rendering engine 200, followed by a manual or sensor based trigger for generation and rendering of highlights for a portion of the video content 208 between the start trigger and the stop trigger. For example, the user may manually activate the highlights generation and rendering engine 200 via the second device prior to or while viewing the video content on the first device. Alternatively, the engine 200 may be automatically activated for a registered user on detecting the registered user or the pre-paired second device of the registered user in proximity of the first device (determined based on user information 207 for the registered user and sensor inputs from the proximity sensor, the beacon, or the imaging device). Further, the user may provide manual inputs 209 for the start trigger and the stop trigger via the second device to request generation and rendering of highlights for the portion of the video content 208. Alternatively, the start trigger and the stop trigger may be automatically detected based on sensor inputs 209 (e.g., inputs from proximity sensor, beacon, imaging device, microphone, etc.), user information 207, and pre-defined criteria. The pre-defined criteria may include, but are not limited to, an absence of the registered user from a viewing position of the first device, an engagement of the registered user with the second device, and a movement of the registered user away from the first device. It should be noted that, in some embodiments, the trigger generation module 201 may perform audio or video or image processing to determine occurrence of the pre-defined criteria. For example, the trigger generation module 201 may process the image or the video to detect the presence or absence of the user from in front of the first device.

In some embodiments, the recording module 202 may record the portion of the video content 208 between the start trigger and the stop trigger. Alternatively, in some embodiments, the recording module 202 may record one or more sub-portions of the portion of the video content 208 between the start trigger and the stop trigger. The one or more sub-portions of the video content 208 may be determined based on detection of critical events by the critical event detection module 203. For example, the sub-portion of the video content 208 may include a buffered portion of the video content 208 in which the critical event has been detected by the critical event detection module 203. Additionally, the recording module 202 may discard the portion of the video content or the sub-portion of the video content either directly if no critical events are detected, or upon making a copy of the portion or the sub-portion of the video content if a critical event is detected. Further, the recording module 202 may provide the copy of the portion or the sub-portion of the video content 208 along with a time-stamp of the critical event to the highlights generation module 204.

In some embodiments, the critical event detection module 203 may monitor or analyze the portion of the video content 208 between the start trigger and the stop trigger recorded by the recording module 203 so as to detect one or more critical events. Additionally, the critical event detection module 203 may provide a positive or a negative indication of critical event to the recording module 202 so as to enable the recording module 202 to either discard or make a copy of the portion of the video content 208 based on the detection of the one or more critical event. Alternatively, in some embodiments, the critical event detection module 203 may monitor or analyze the portion of the video content 208 playing on the first device between the start trigger and the stop trigger, and may detect one or more critical events in the portion of the video content 208. Upon detection of each critical event, the critical event detection module 203 may trigger the recording module 202 to record a corresponding sub-portion of the video content 208. Further, the critical event detection module 203 may provide a time stamp of the critical event to the recording module 202.

The critical event detection module 203 may detect the critical event by analyzing the video content 208 as well as one or more sensor based inputs 209. The sensor based inputs may include, but are not limited to, an ambient audio from the microphone and an ambient video from the imaging device. The one or more critical events may include, but are not limited to, an instant change in an audio level of the video content (e.g., rising pitch in the video content, rapid change in scenes in the video content, applause in the video content, etc.), an instant change in an audio level of the ambient audio (e.g., applause from viewers, cheering from viewers, etc.), an instant change in expression of viewers viewing the content in the ambient video (e.g., excitement of viewers, gesture or posture of viewers, happy or sad face of viewers, etc.), an instant change in one or more pre-defined areas within the video content (e.g., jump in score in a match, fall of wickets, etc.), an identification of one or more pre-defined keywords in the video content or in the ambient audio (e.g., exclamatory words or keywords uttered in the video content, exclamatory words or keywords uttered by the viewers, etc.), and an identification of one or more pre-defined gestures in the video content (e.g., giving a red card by referee, raising of both hands by umpire, raising of one hand by umpire, chest thumping by player, fist pumping by the player, etc.). It should be noted that, in some embodiments, the critical event detection module 203 may perform audio or video or image processing to determine the critical events. For example, the critical event detection module 203 may process the video to extract a current score and compare the current score with a previous score extracted similarly so as to detect a jump in the score.

Figure 3:
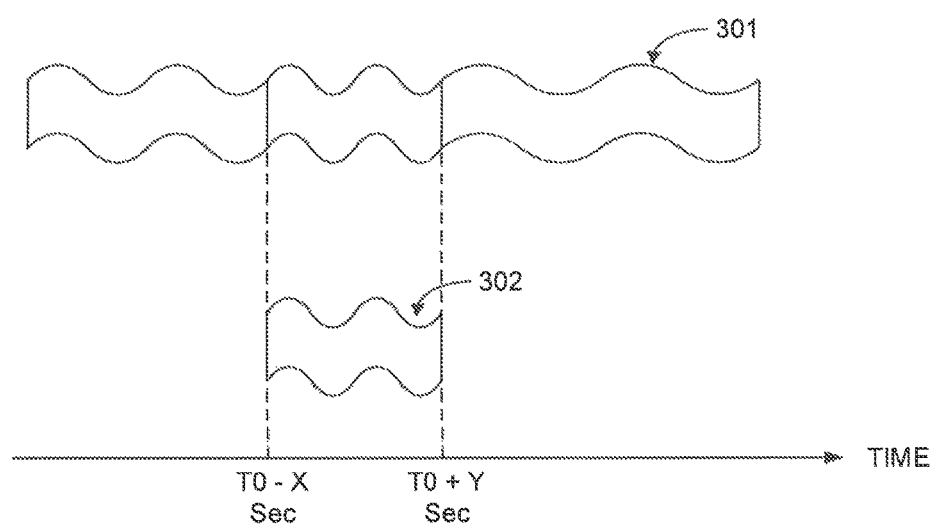
FIG. 3 illustrates an exemplary generation of highlights in accordance with some embodiments of the present disclosure.

The highlights generation module 204 may receive the copy of the portion or the sub-portion of the video content 208 along with a time-stamp of the critical event from the recording module 202. The highlights generation module 204 may then dynamically generate the highlights of the portion or the sub-portion of the video content 208 for the critical event. Referring now to FIG. 3, an exemplary generation of highlights of the portion or the sub-portion 301 of the video content 208 is illustrated in accordance with some embodiments of the present disclosure. The highlights generation module 204 may generate highlights by extracting a further sub-portion of the video content 302 from the portion or the sub-portion 301 of the video content 208 about a critical event (occurring at time T0 seconds). For example, the highlights generation module 204 may extract the further sub-portion of the video content 302 from about a pre-defined time interval (X seconds) before a critical event (i.e., T0−X seconds) to about a pre-defined time interval (Y seconds) after the critical event (i.e., T0+Y seconds) for the critical event. Thus, highlights of X+Y seconds covering the critical event may be generated. It should be noted that the pre-defined time intervals before and after the critical event (i.e., X seconds and Y seconds) may either be pre-configured by the service provider or by the registered user. Referring back to FIG. 2, the generated highlights may be provided to the highlights rendering module 205. Alternatively, the generated highlights may be stored in the database 206 for subsequent access by the highlights rendering module 205. The stored highlights may be stored in the databased 206 in an organized manner (e.g., by date, genre, content name, etc.) to facilitate access by the user.

The highlights rendering module 205 may receive the highlights from the highlights generation module 204 or may access the highlights from the database 206. The highlights rendering module 205 may then dynamically render the generated highlights of the portion or the sub-portion of the video content 208 on the second device in possession of the registered user. In some embodiments, the highlights rendering module 205 may automatically push (i.e., upload) the highlights on the second device of the user. Alternatively, in some embodiments, the highlights rendering module 205 may notify the user of the availability of highlights with the engine 200 through the second device. The user may then proactively access the highlights from the engine 200 by either downloading the highlights or streaming the highlights. In such embodiments, the highlights rendering module 205 may facilitate the proactive access of the highlights by the user from the database 206.

As will be appreciated by one skilled in the art, a variety of processes may be employed for dynamically generating and rendering highlights of a video content. For example, the exemplary system 100 may dynamically generate and render the highlights of the video content by the processes discussed herein. In particular, as will be appreciated by those of ordinary skill in the art, control logic and/or automated routines for performing the techniques and steps described herein may be implemented by the system 100, either by hardware, software, or combinations of hardware and software. For example, suitable code may be accessed and executed by the one or more processors on the system 100 to perform some or all of the techniques described herein. Similarly, application specific integrated circuits (ASICs) configured to perform some or all of the processes described herein may be included in the one or more processors on the system 100.

Figure 4:
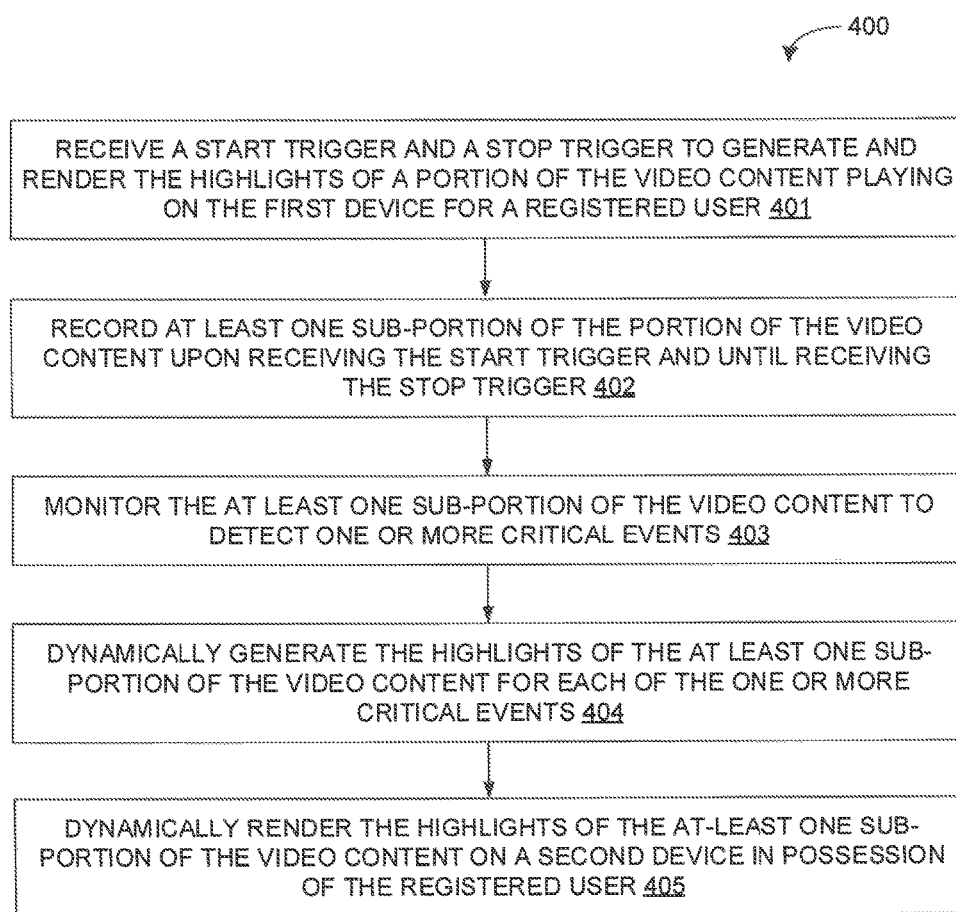
FIG. 4 is a flow diagram of an exemplary process for dynamically generating and rendering highlights of a video content in accordance with some embodiments of the present disclosure.

For example, referring now to FIG. 4, exemplary control logic 400 for dynamically generating and rendering highlights of a video content playing on a first device via a system, such as system 100, is depicted via a flowchart in accordance with some embodiments of the present disclosure. As illustrated in the flowchart, the control logic 400 may include the steps of receiving a start trigger and a stop trigger to generate and render the highlights of a portion of the video content playing on the first device for a registered user at step 401, recording at least one sub-portion of the portion of the video content upon receiving the start trigger and until receiving the stop trigger at step 402, monitoring the at least one sub-portion of the video content to detect one or more critical events at step 403, dynamically generating the highlights of the at least one sub-portion of the video content for each of the one or more critical events at step 404, and dynamically rendering the highlights of the at-least one sub-portion of the video content on a second device in possession of the registered user at step 405. In some embodiments, the control logic 400 may further include the step of discarding the at least one sub-portion of the video content either directly or upon making a copy of the at least one sub-portion of the video content based on the detection of the one or more critical events. Additionally, in some embodiments, the first device may include one of a television, and a computing device, and wherein the second device may include a personal computing device. Further, in some embodiments, the system 100 may be activated through the second device by the registered user prior to viewing the video content on the first device.

In some embodiments, each of the start trigger and the stop trigger may include at least one of a manual trigger, and a sensor based trigger. Additionally, in some embodiments, the sensor based trigger may be generated from one or more sensors in at least one of the first device, the second device, and the highlights generation and rendering system. Further, in some embodiments, the sensor based trigger may include at least one of an absence of the registered user from a viewing position of the first device, an engagement of the registered user with the second device, and a movement of the registered user away from the first device.

In some embodiments, the one or more critical events may be detected by analyzing at least one of a sensor based parameter and the video content, wherein the sensor based parameter may include at least one of an ambient audio, and an ambient video. Additionally, in some embodiments, the sensor based parameter may be generated from one or more sensors in at least one of the first device, the second device, and the highlights generation and rendering system. Further, in some embodiments, each of the one or more critical events may include at least one of an instant change in an audio level of the video content, an instant change in an audio level of the ambient audio, an instant change in expression of viewers viewing the content in the ambient video, an instant change in one or more pre-defined areas within the video content, an identification of one or more pre-defined keywords in the video content or in the ambient audio, and an identification of one or more pre-defined gestures in the video content.

In some embodiments, dynamically generating the highlights at step 404 may include extracting, for each of the one or more critical events, a further sub-portion of the video content from the at least one sub-portion of the video content from about a pre-defined time interval before a critical event to about a pre-defined time interval after the critical event. Additionally, in some embodiments, dynamically rendering the highlights at step 405 may include one of automatically pushing or proactively accessing the highlights of the at least one sub-portion of the video content on the second device.

In some embodiments, the registered user may register with the highlights generation and rendering system by at least one of creating a user profile, registering the second device, and downloading an application on the second device. Additionally, in some embodiments, the user profile may include at least an identification of the registered user, an authentication information of the registered user, an image of the user, a list of preferred video contents, a list of preferred genres, a customized definition of the critical event, a customized definition of the start trigger, a customized definition of the stop trigger, and a preferred length of recording, and a preferred size of storage for recording.

Figure 5:
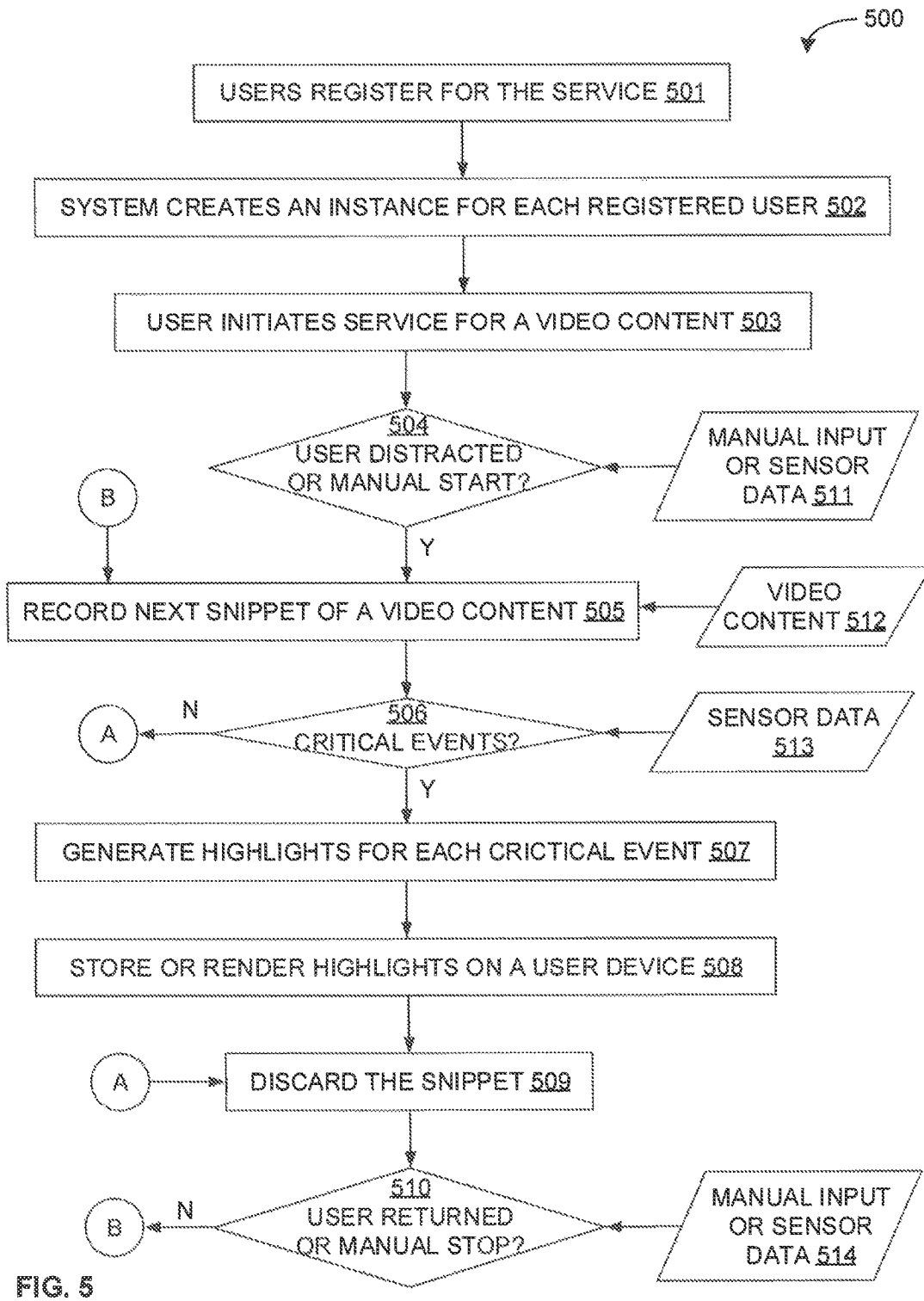
FIG. 5 is a flow diagram of a detailed exemplary process for dynamically generating and rendering highlights of a video content in accordance with some embodiments of the present disclosure.

Referring now to FIG. 5, exemplary control logic 500 for determining effectiveness of product promotions is depicted in greater detail via a flowchart in accordance with some embodiments of the present disclosure. As illustrated in the flowchart, at step 501, one or more users may register for the highlights generation and rendering service provided by the system. At step 502, the system may create an instance for each of the registered users. At step 503, the user may initiate a service for a video content playing on a first device. At step 504, the control logic 500 may determine if a start trigger has been received. The determination may be made by checking if the manual input 511 is a manual start trigger. Alternatively, the determination may be made by analyzing the sensor data 511 to detect if the user is distracted. If the start trigger is received, then at step 505, the control logic 500 may record a sub-portion or a snippet of the video content 512. It should be noted that the sub-portion or the snippet of video content 512 may be a buffered video content.

At step 506, the control logic 500 may determine if there are one or more critical events in the snippet. The determination may be made by analyzing the snippet or the sensor data 513. If one or more critical events are detected in the snippet, then at step 507, the control logic 500 may generate highlights for each critical event. At step 508, the control logic 500 may render the highlights on a user device (i.e., the second device) or may store the highlights on a database for subsequent rendering to the user. At step 509, the control logic 500 may discard the snippet. It should be noted that, if any critical event is not detected in the snippet at step 506, then the control logic 500 may directly flow to step 509 and the snippet may be discarded. At step 510, the control logic 500 may determine if a stop trigger has been received. The determination may be made by checking if the manual input 514 is a manual stop trigger. Alternatively, the determination may be made by analyzing the sensor data 514 to detect if the user is back and engaged with the video content. If the stop trigger is not received, then the control logic 500 may flow back to step 505 and a next snippet may be recorded.

As will be also appreciated, the above described techniques may take the form of computer or controller implemented processes and apparatuses for practicing those processes. The disclosure may also be embodied in the form of computer program code containing instructions embodied in tangible media, such as floppy diskettes, solid state drives, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments may configure the microprocessor to create specific logic circuits.

Figure 6:
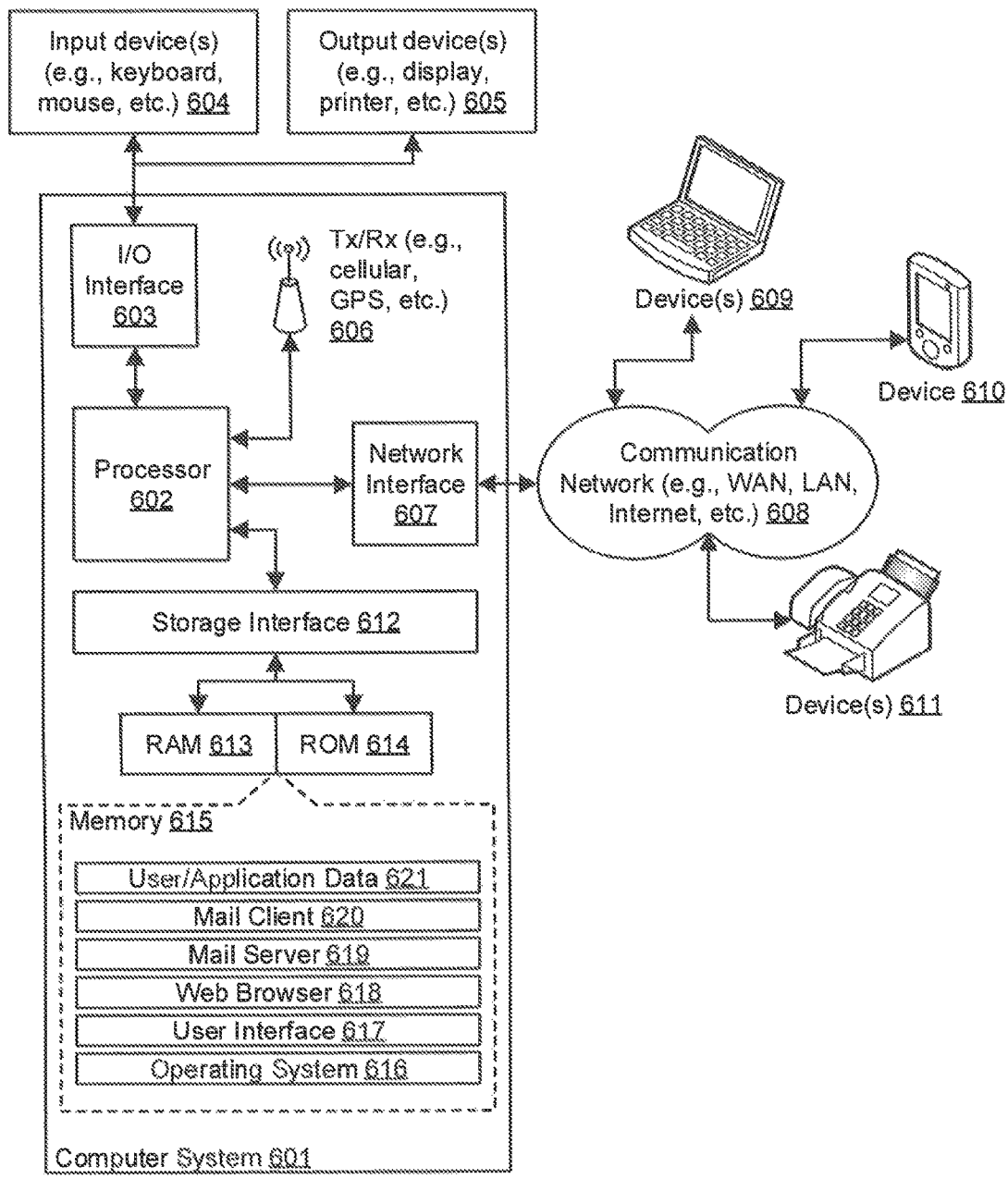
FIG. 6 is a block diagram of an exemplary computer system for implementing embodiments consistent with the present disclosure.

Referring now to FIG. 6, a block diagram of an exemplary computer system 601 for implementing embodiments consistent with the present disclosure is illustrated. Variations of computer system 601 may be used for implementing system

100 for dynamically generating and rendering highlights of a video content. Computer system 601 may include a central processing unit ("CPU" or "processor") 602. Processor 602 may include at least one data processor for executing program components for executing user-generated or system-generated requests. A user may include a person, a person using a device such as such as those included in this disclosure, or such a device itself. The processor may include specialized processing units such as integrated system (bus) controllers, memory management control units, floating point units, graphics processing units, digital signal processing units, etc. The processor may include a microprocessor, such as AMD Athlon, Duron or Opteron, ARM's application, embedded or secure processors, IBM PowerPC, Intel's Core, Itanium, Xeon, Celeron or other line of processors, etc. The processor 602 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 602 may be disposed in communication with one or more input/output (I/O) devices via I/O interface 603. The I/O interface 603 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n/b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 603, the computer system 601 may communicate with one or more I/O devices. For example, the input device 604 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, altimeter, gyroscope, proximity sensor, or the like), stylus, scanner, storage device, transceiver, video device/source, visors, etc. Output device 605 may be a printer, fax machine, video display (e.g., cathode ray tube (CRT), liquid crystal display (LCD), light-emitting diode (LED), plasma, or the like), audio speaker, etc. In some embodiments, a transceiver 606 may be disposed in connection with the processor 602. The transceiver may facilitate various types of wireless transmission or reception. For example, the transceiver may include an antenna operatively connected to a transceiver chip (e.g., Texas Instruments WiLink WL1283, Broadcom BCM4750IUB8, Infineon Technologies X-Gold 618-PMB9800, or the like), providing IEEE 802.11a/b/g/n, Bluetooth, FM, global positioning system (GPS), 2G/3G HSDPA/HSUPA communications, etc.

In some embodiments, the processor 602 may be disposed in communication with a communication network 608 via a network interface 607. The network interface 607 may communicate with the communication network 608. The network interface may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 608 may include, without limitation, a direct interconnection, local area network (LAN), wide area network (WAN), wireless network (e.g., using Wireless Application Protocol), the Internet, etc. Using the network interface 607 and the communication network 608, the computer system 601 may communicate with devices 609, 610, and 611. These devices may include, without limitation, personal computer(s), server(s), fax machines, printers, scanners, various mobile devices such as cellular telephones, smartphones (e.g., Apple iPhone, Blackberry, Android-based phones, etc.), tablet computers, eBook readers (Amazon Kindle, Nook, etc.), laptop computers, notebooks, gaming consoles (Microsoft Xbox, Nintendo DS, Sony PlayStation, etc.), or the like. In some embodiments, the computer system 601 may itself embody one or more of these devices.

In some embodiments, the processor 602 may be disposed in communication with one or more memory devices (e.g., RAM 613, ROM 614, etc.) via a storage interface 612. The storage interface may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 616, user interface application 617, web browser 618, mail server 619, mail client 620, user/application data 621 (e.g., any data variables or data records discussed in this disclosure), etc. The operating system 616 may facilitate resource management and operation of the computer system 601. Examples of operating systems include, without limitation, Apple Macintosh OS X, Unix, Unix-like system distributions (e.g., Berkeley Software Distribution (BSD), FreeBSD, NetBSD, OpenBSD, etc.), Linux distributions (e.g., Red Hat, Ubuntu, Kubuntu, etc.), IBM OS/2, Microsoft Windows (XP, Vista/7/8, etc.), Apple iOS, Google Android, Blackberry OS, or the like. User interface 617 may facilitate display, execution, interaction, manipulation, or operation of program components through textual or graphical facilities. For example, user interfaces may provide computer interaction interface elements on a display system operatively connected to the computer system 601, such as cursors, icons, check boxes, menus, scrollers, windows, widgets, etc. Graphical user interfaces (GUIs) may be employed, including, without limitation, Apple Macintosh operating systems' Aqua, IBM OS/2, Microsoft Windows (e.g., Aero, Metro, etc.), Unix X-Windows, web interface libraries (e.g., ActiveX, Java, Javascript, AJAX, HTML, Adobe Flash, etc.), or the like.

In some embodiments, the computer system 601 may implement a web browser 618 stored program component. The web browser may be a hypertext viewing application, such as Microsoft Internet Explorer, Google Chrome, Mozilla Firefox, Apple Safari, etc. Secure web browsing may be provided using HTTPS (secure hypertext transport protocol), secure sockets layer (SSL), Transport Layer Security (TLS), etc. Web browsers may utilize facilities such as AJAX, DHTML, Adobe Flash, JavaScript, Java, application programming interfaces (APIs), etc. In some embodiments, the computer system 601 may implement a mail server 619 stored program component. The mail server may be an Internet mail server such as Microsoft Exchange, or the like. The mail server may utilize facilities such as ASP, ActiveX, ANSI C++/C#, Microsoft .NET, CGI scripts, Java, JavaScript, PERL, PHP, Python, WebObjects, etc. The mail server may utilize communication protocols such as internet message access protocol (IMAP), messaging application programming interface (MAPI), Microsoft Exchange, post office protocol (POP), simple mail transfer protocol (SMTP), or the like. In some embodiments, the computer system 601 may implement a mail client 620 stored program component. The mail client may be a mail viewing application, such as Apple Mail, Microsoft Entourage, Microsoft Outlook, Mozilla Thunderbird, etc.

In some embodiments, computer system 601 may store user/application data 621, such as the data, variables, records, etc. (e.g., user profiles, identification of various second devices, sensor parameters, recorded video content, highlights, pre-defined criteria for triggers, pre-defined criteria for critical events, time stamps of critical events, and so forth) as described in this disclosure. Such databases may be implemented as fault-tolerant, relational, scalable, secure databases such as Oracle or Sybase. Alternatively, such databases may be implemented using standardized data structures, such as an array, hash, linked list, struct, structured text file (e.g., XML), table, or as object-oriented databases (e.g., using ObjectStore, Poet, Zope, etc.). Such databases may be consolidated or distributed, sometimes among the various computer systems discussed above in this disclosure. It is to be understood that the structure and operation of the any computer or database component may be combined, consolidated, or distributed in any working combination.

As will be appreciated by those skilled in the art, the techniques described in the various embodiments discussed above may enable dynamic generation of highlights of a video content playing on the first device, and dynamic rendering of the generated highlights on the second device. The techniques may automatically generate highlights around critical events (key portions) of a portion of the video content defined by the triggering events. In some embodiments, the portion of the video content defined by the triggering event may be a portion of the video content missed by the user due to a distracting event. In some embodiments, the video content may be a live broadcast content. Thus, in some embodiments, the techniques may address a need to retrieve missed or lapsed content in the live broadcast video content such as a sporting event. The techniques may ensure that the viewer is updated about the event and/or gets back to the context of the event in a short time without having to disturb to other co-viewers. Additionally, the techniques may enable event content based analysis (i.e., critical event analysis) that may help sports players or coaches to track and critically review critical events.

The specification has described system and method for dynamically generating and rendering highlights of a video content. The illustrated steps are set out to explain the exemplary embodiments shown, and it should be anticipated that ongoing technological development may change the manner in which particular functions are performed. These examples are presented herein for purposes of illustration, and not limitation. Further, the boundaries of the functional building blocks have been arbitrarily defined herein for the convenience of the description. Alternative boundaries may be defined so long as the specified functions and relationships thereof are appropriately performed. Alternatives (including equivalents, extensions, variations, deviations, etc., of those described herein) may be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium may refer to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A method for dynamically generating and rendering highlights of a video content playing on a first device, the method comprising:
   receiving, by a highlights generation and rendering device, a start trigger and a stop trigger to generate and render the highlights of a portion of the video content playing on the first device for a registered user, wherein the portion of the video content comprises the video content between the start trigger and the stop trigger, and wherein the start trigger and the stop trigger comprise a sensor based trigger;
   iteratively recording, by the highlights generation and rendering device, at least one sub-portion of the portion of the video content upon receiving the start trigger and until receiving the stop trigger;
   monitoring, by the highlights generation and rendering device, the at least one sub-portion of the video content to detect one or more critical events;
   dynamically generating, by the highlights generation and rendering device, the highlights of the at least one sub-portion of the video content for each of the one or more critical events, wherein dynamically generating the highlights comprises extracting, for a given critical event, a further sub-portion of the video content, from the at least one sub-portion of the video content, comprising the given critical event; and
   dynamically rendering, by the highlights generation and rendering device, the highlights of the at-least one sub-portion of the video content on a second device in possession of the registered user,
       wherein the sensor based trigger is generated from one or more sensors in at least one of the first device, the second device, and the highlights generation and rendering device, and wherein the sensor based trigger comprises at least one of an absence of the registered user from a viewing position of the first device, an engagement of the registered user with the second device, and a movement of the registered user away from the first device.

2. The method of claim 1, further comprising discarding the at least one sub-portion of the video content either directly or upon making a copy of the at least one sub-portion of the video content based on the detection of the one or more critical events.

3. The method of claim 1, wherein the one or more critical events are detected by analyzing at least one of a sensor based parameter and the video content, wherein the sensor based parameter comprises at least one of an ambient audio, and an ambient video, and wherein the sensor based parameter is generated from one or more sensors in at least one of the first device, the second device, and the highlights generation and rendering device.

4. The method of claim 3, wherein each of the one or more critical events comprises at least one of an instant change in an audio level of the video content, an instant change in an audio level of the ambient audio, an instant change in expression of viewers viewing the content in the ambient video, an instant change in one or more pre-defined areas within the video content, an identification of one or more pre-defined keywords in the video content or in the ambient audio, and an identification of one or more pre-defined gestures in the video content.

5. The method of claim 1, wherein extracting the further sub-portion of the video content comprises extracting the further sub-portion from about a pre-defined time interval before a critical event to about a pre-defined time interval after the critical event.

6. The method of claim 1, wherein dynamically rendering comprises one of automatically pushing or proactively accessing the highlights of the at least one sub-portion of the video content on the second device.

7. The method of claim 1, wherein the registered user registers with the highlights generation and rendering device by at least one of creating a user profile, registering the second device, and downloading an application on the second device.

8. The method of claim 7, wherein the user profile comprises at least an identification of the registered user, an authentication information of the registered user, an image of the user, a list of preferred video contents, a list of preferred genres, a customized definition of the critical event, a customized definition of the start trigger, a customized definition of the stop trigger, and a preferred length of recording, and a preferred size of storage for recording.

9. The method of claim 1, wherein the highlights generation and rendering device is activated through the second device by the registered user prior to viewing the video content on the first device.

10. The method of claim 1, wherein the first device comprises one of a television, and a computing device, and wherein the second device comprises a personal computing device.

11. A system for dynamically generating and rendering highlights of a video content playing on a first device, the system comprising:
    a highlights generation and rendering device comprising at least one processor and a computer-readable medium storing instructions that, when executed by the at least one processor, cause the at least one processor to perform operations comprising:
        receiving a start trigger and a stop trigger to generate and render the highlights of a portion of the video content playing on the first device for a registered user, wherein the portion of the video content comprises the video content between the start trigger and the stop trigger, and wherein the start trigger and the stop trigger comprise a sensor based trigger;
        iteratively recording at least one sub-portion of the portion of the video content upon receiving the start trigger and until receiving the stop trigger;
        monitoring the at least one sub-portion of the video content to detect one or more critical events;
        dynamically generating the highlights of the at least one sub-portion of the video content for each of the one or more critical events, wherein dynamically generating the highlights comprises extracting, for a given critical event, a further sub-portion of the video content, from the at least one sub-portion of the video content, comprising the given critical event; and
        dynamically rendering the highlights of the at-least one sub-portion of the video content on a second device in possession of the registered user;
            wherein the sensor based trigger is generated from one or more sensors in at least one of the first device, the second device, and the highlights generation and rendering device, and wherein the sensor based trigger comprises at least one of an absence of the registered user from a viewing position of the first device, an engagement of the registered user with the second device, and a movement of the registered user away from the first device.

12. The system of claim 11, wherein the one or more critical events are detected by analyzing at least one of a sensor based parameter and the video content, wherein the sensor based parameter comprises at least one of an ambient audio, and an ambient video, and wherein the sensor based parameter is generated from one or more sensors in at least one of the first device, the second device, and the highlights generation and rendering device.

13. The system of claim 12, wherein each of the one or more critical events comprises at least one of an instant change in an audio level of the video content, an instant change in an audio level of the ambient audio, an instant change in expression of viewers viewing the content in the ambient video, an instant change in one or more pre-defined areas within the video content, an identification of one or more pre-defined keywords in the video content or in the ambient audio, and an identification of one or more pre-defined gestures in the video content.

14. The system of claim 11, wherein extracting the further sub-portion of the video content comprises extracting the further sub-portion from about a pre-defined time interval before a critical event to about a pre-defined time interval after the critical event.

15. The system of claim 11, wherein the registered user registers with the highlights generation and rendering device by at least one of creating a user profile, registering the second device, and downloading an application on the second device.

16. The system of claim 11, wherein the highlights generation and rendering device is activated through the second device by the registered user prior to viewing the video content on the first device.

17. A non-transitory computer-readable medium storing computer-executable instructions for:
    receiving a start trigger and a stop trigger to generate and render the highlights of a portion of the video content playing on the first device for a registered user, wherein the portion of the video content comprises the video content between the start trigger and the stop trigger, and wherein the start trigger and the stop trigger comprise a sensor based trigger;
    iteratively recording at least one sub-portion of the portion of the video content upon receiving the start trigger and until receiving the stop trigger;
    monitoring the at least one sub-portion of the video content to detect one or more critical events;

dynamically generating the highlights of the at least one sub-portion of the video content for each of the one or more critical events, wherein dynamically generating the highlights comprises extracting, for a given critical event, a further sub-portion of the video content, from the at least one sub-portion of the video content, comprising the given critical event; and dynamically rendering the highlights of the at-least one sub-portion of the video content on a second device in possession of the registered user, wherein the sensor based trigger is generated from one or more sensors in at least one of the first device, the second device, and the highlights generation and rendering device, and wherein the sensor based trigger comprises at least one of an absence of the registered user from a viewing position of the first device, an engagement of the registered user with the second device, and a movement of the registered user away from the first device.

\* \* \* \* \*